(12) United States Patent
Fujimori

(10) Patent No.: US 6,592,226 B1
(45) Date of Patent: Jul. 15, 2003

(54) UNIT FOR MOUNTING ELECTRO-OPTICAL DEVICE AND PROJECTOR USING THE UNIT

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/714,518

(22) Filed: Nov. 17, 2000

Related U.S. Application Data

(63) Continuation-in-part of application No. 09/495,178, filed on Feb. 1, 2000.

(30) Foreign Application Priority Data

Nov. 24, 1999 (JP) ............................................ 11-333498

(51) Int. Cl.$^7$ ......................... G03B 21/00; G03B 21/14; G03B 21/22; G03B 21/28
(52) U.S. Cl. ............................ 353/31; 353/33; 353/81; 353/119; 353/122
(58) Field of Search .......................... 353/31, 33, 119, 353/122, 81

(56) References Cited

U.S. PATENT DOCUMENTS

| | | | | |
|---|---|---|---|---|
| 3,904,287 A | * | 9/1975 | Matsumura | 353/114 |
| 5,978,054 A | | 11/1999 | Fujimori | 349/60 |
| 6,292,239 B1 | * | 9/2001 | Nagamura et al. | 349/58 |
| 6,320,709 B1 | * | 11/2001 | Kitabayashi et al. | 359/831 |

FOREIGN PATENT DOCUMENTS

| | | |
|---|---|---|
| JP | 10-10994 | 1/1998 |
| WO | WO 95/12142 | 4/1995 |

* cited by examiner

*Primary Examiner*—Russell Adams
*Assistant Examiner*—Magda Cruz
(74) *Attorney, Agent, or Firm*—Oliff & Berridge, PLC

(57) ABSTRACT

A unit is provided for mounting an electro-optical device, such a liquid crystal panel, on a prism so that aberration in picture elements is suppressed so as not to deteriorate image quality. The unit for mounting an electro-optical device includes an electro-optical-device supporting frame, and a fixing pin for fixing the supporting frame to a face of a prism by an adhesive. The unit includes an absorbing structure disposed between the supporting frame and the fixing pin, for absorbing the difference between the deformation of the supporting frame caused by heat and the strength of the adhesive applied to the fixing pin. The absorbing structure absorbs the effects of thermal expansion of the supporting frame, thereby suppressing the displacement of the electro-optical device caused by the heat generated during the use of the projector.

12 Claims, 12 Drawing Sheets

[FIG. 1]
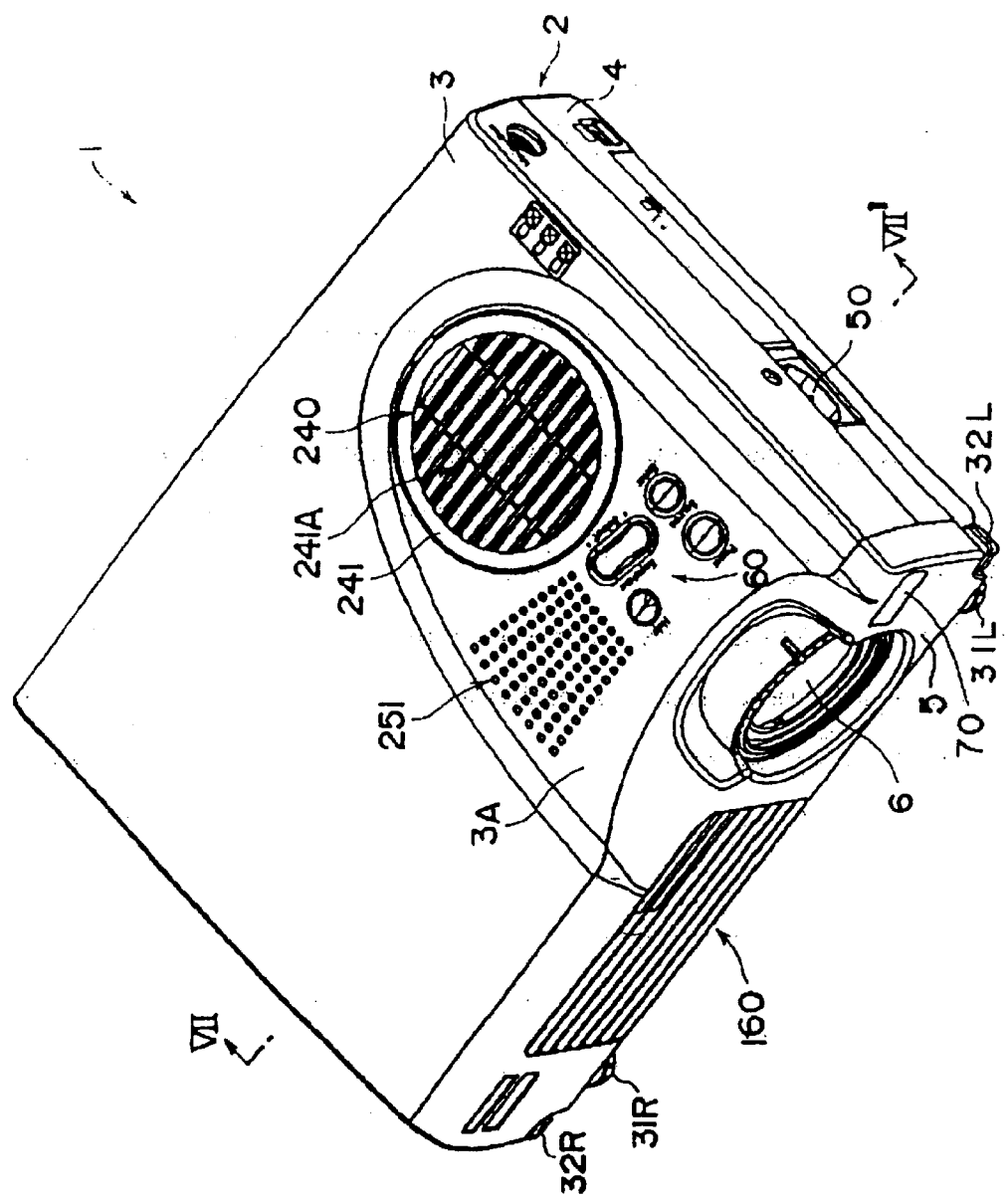

[FIG. 2]
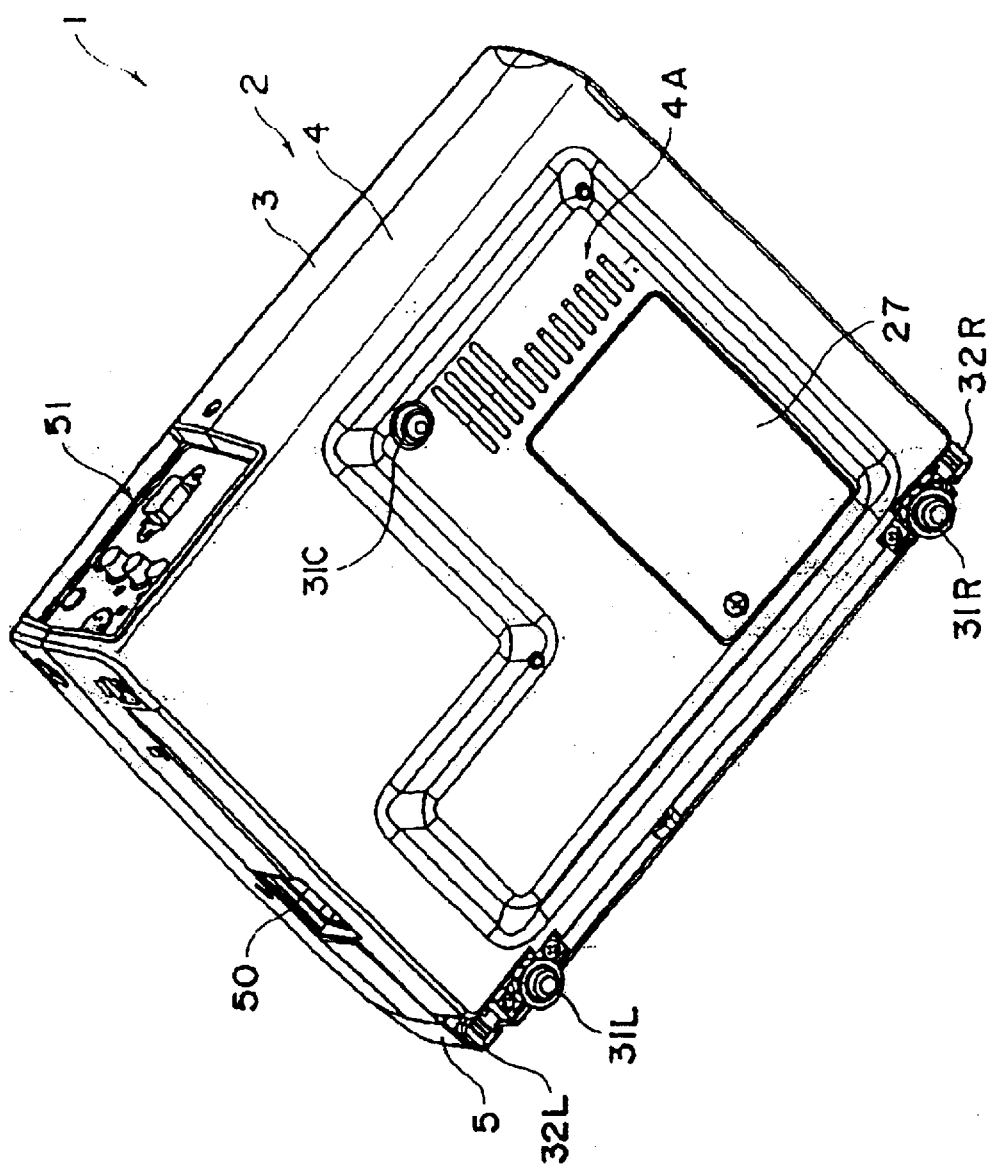

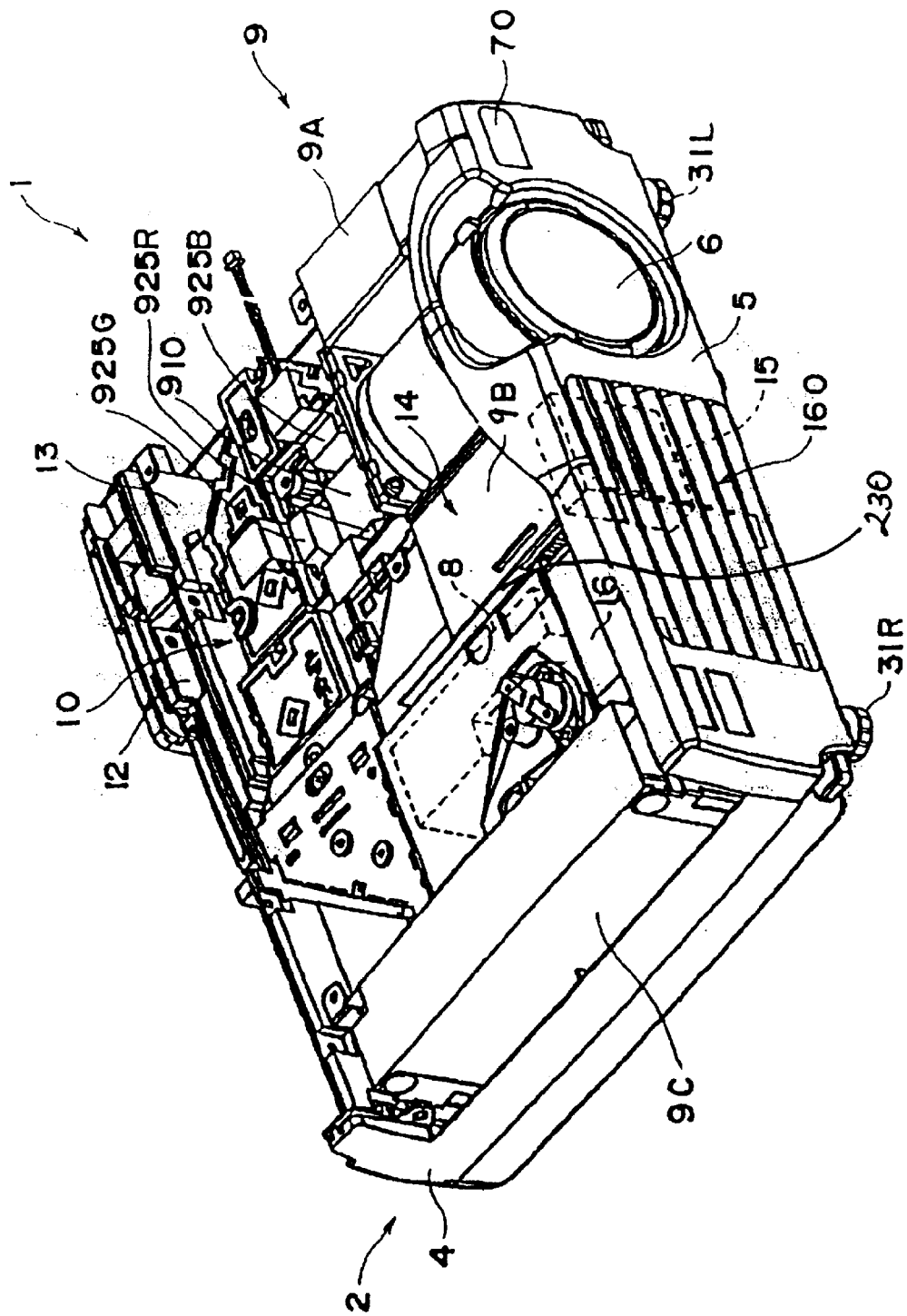
[FIG. 3]

[FIG. 4]
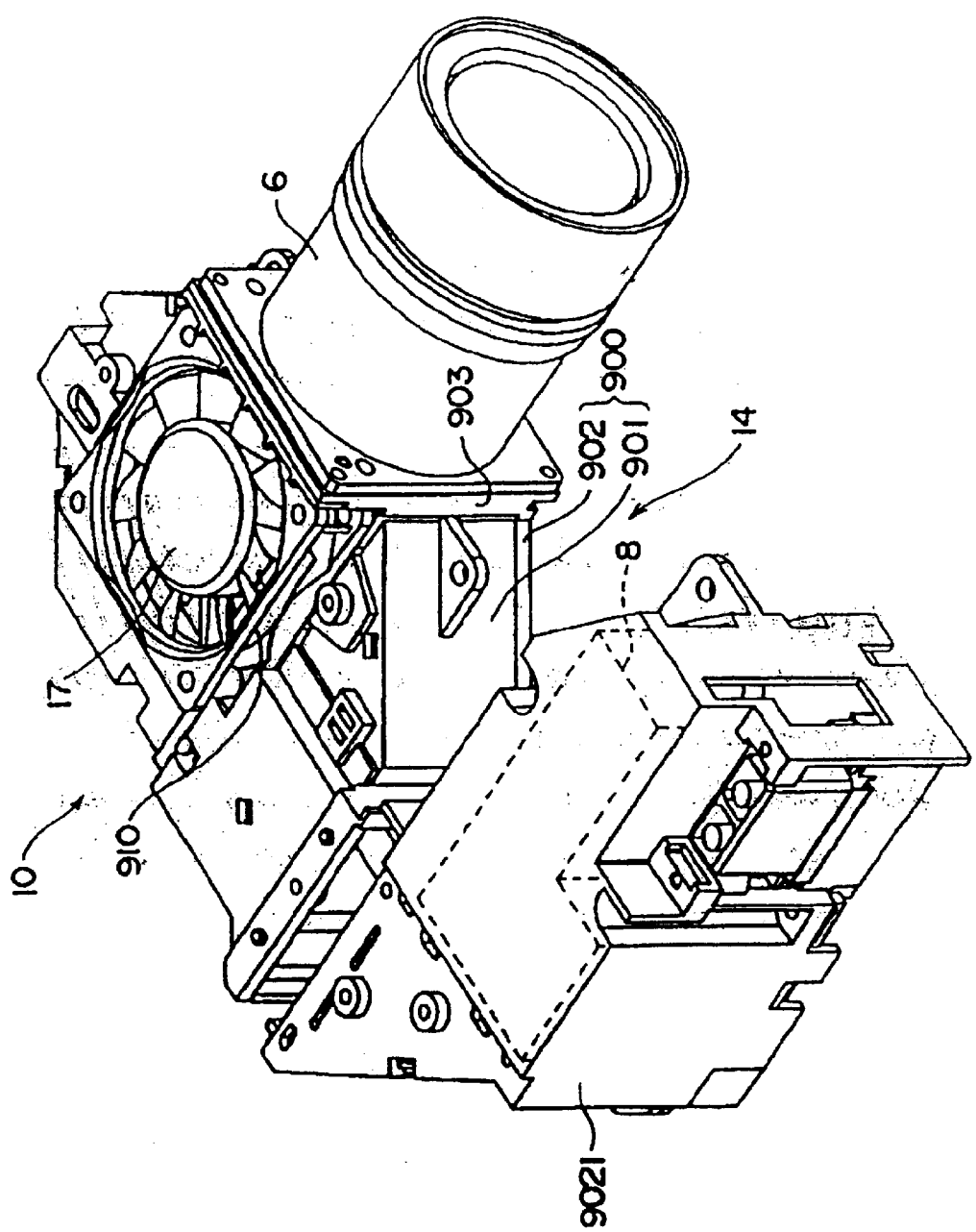

[FIG. 5]
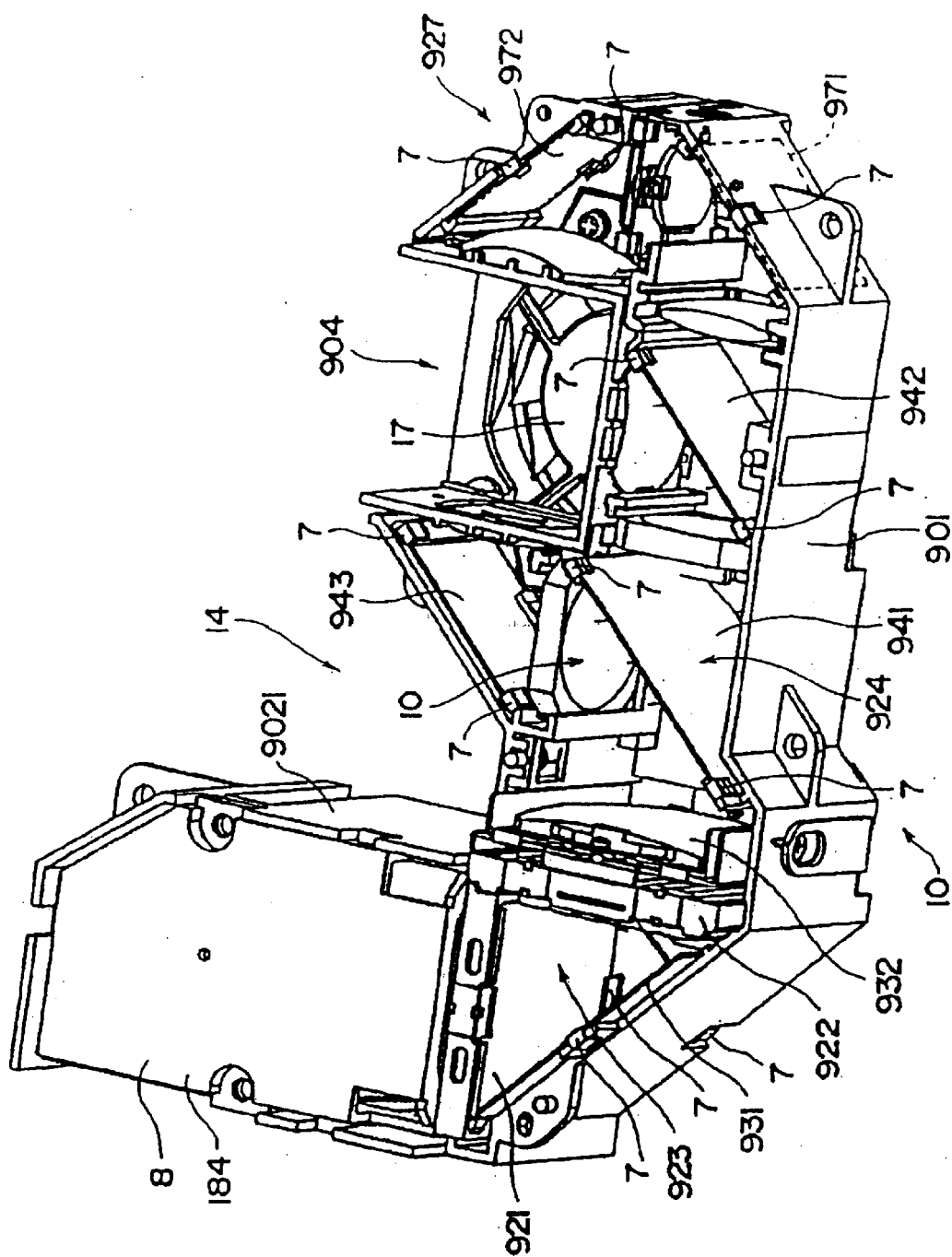

[FIG. 6]
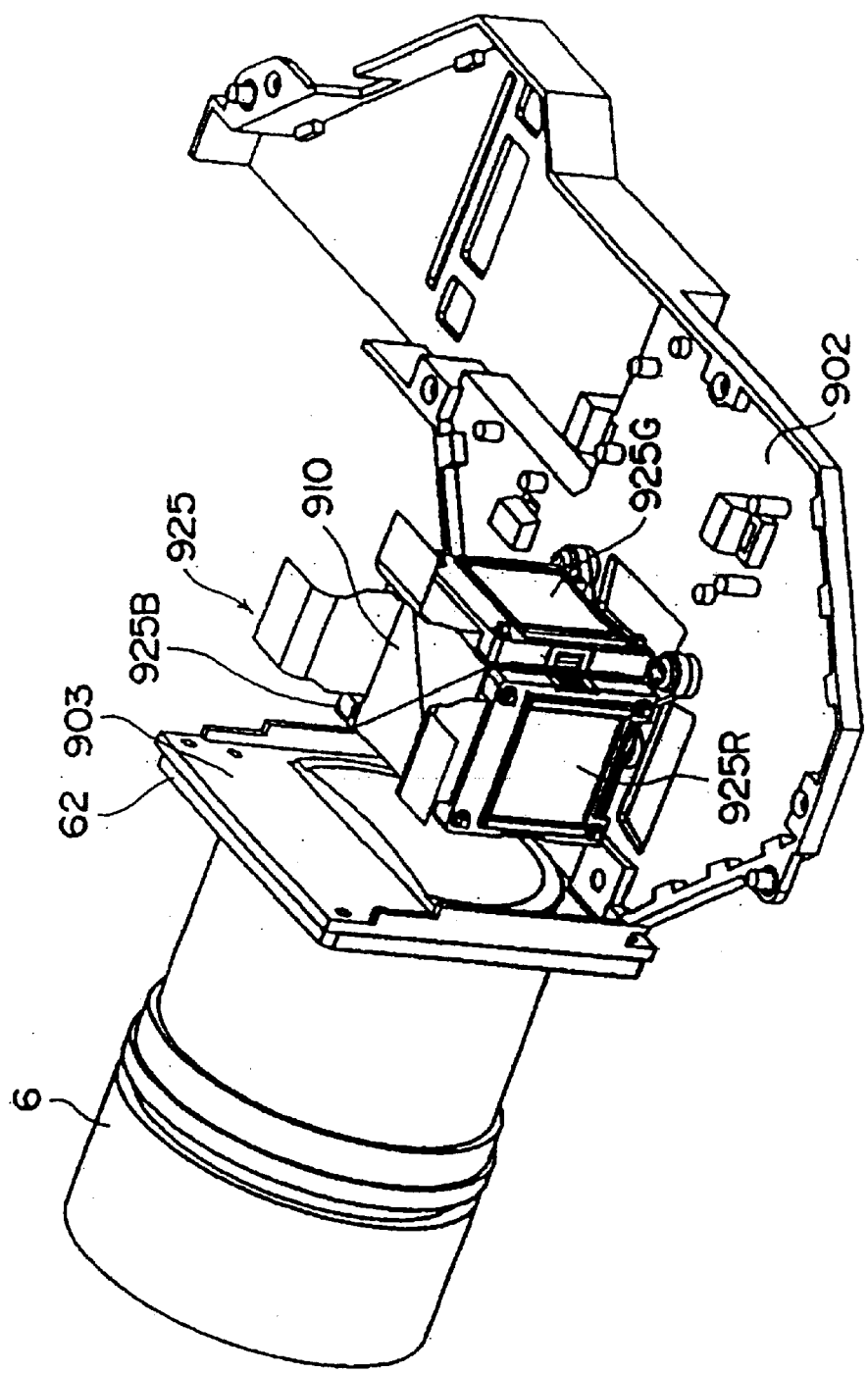

[FIG. 7]
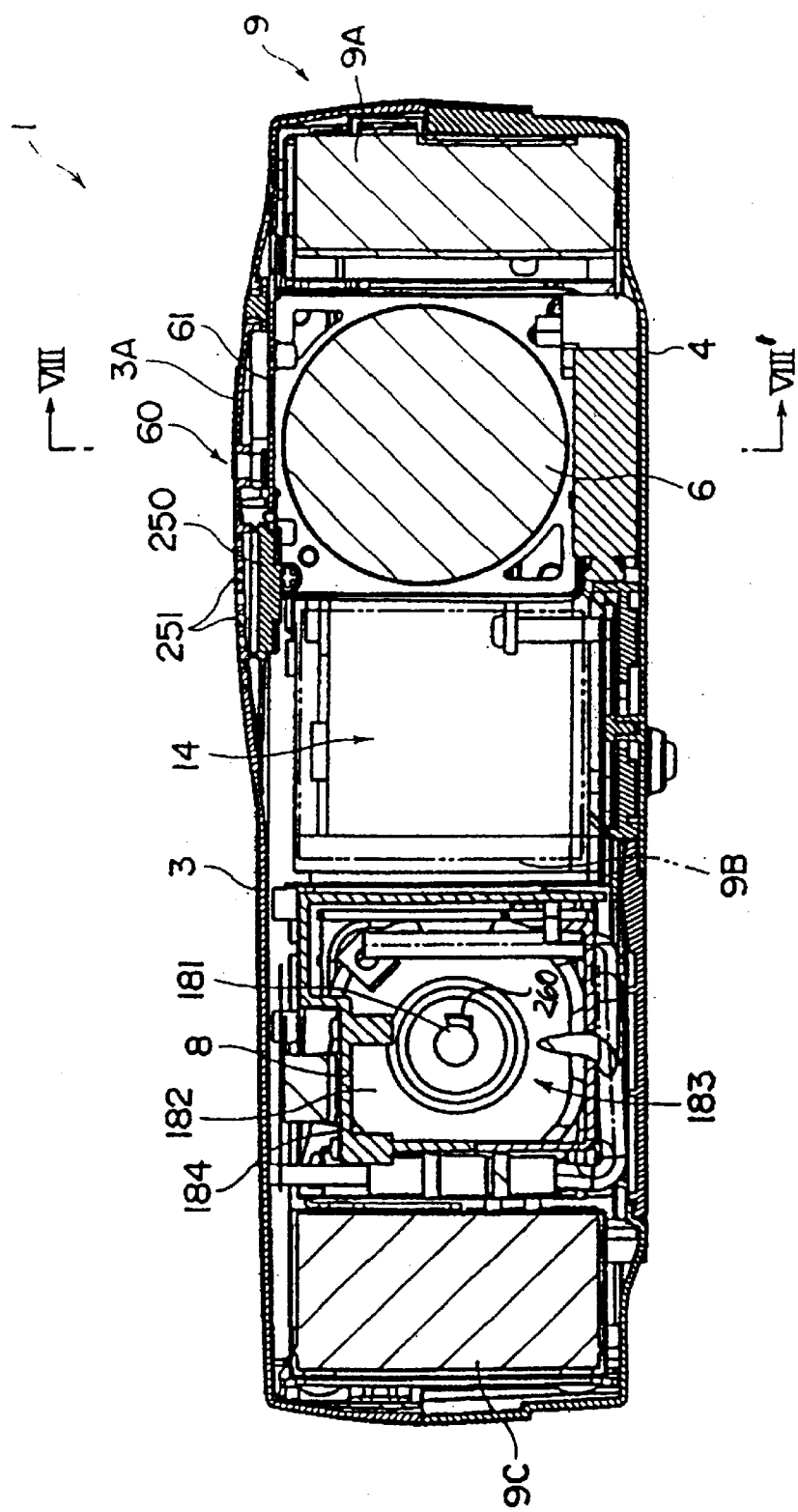

[FIG. 8]
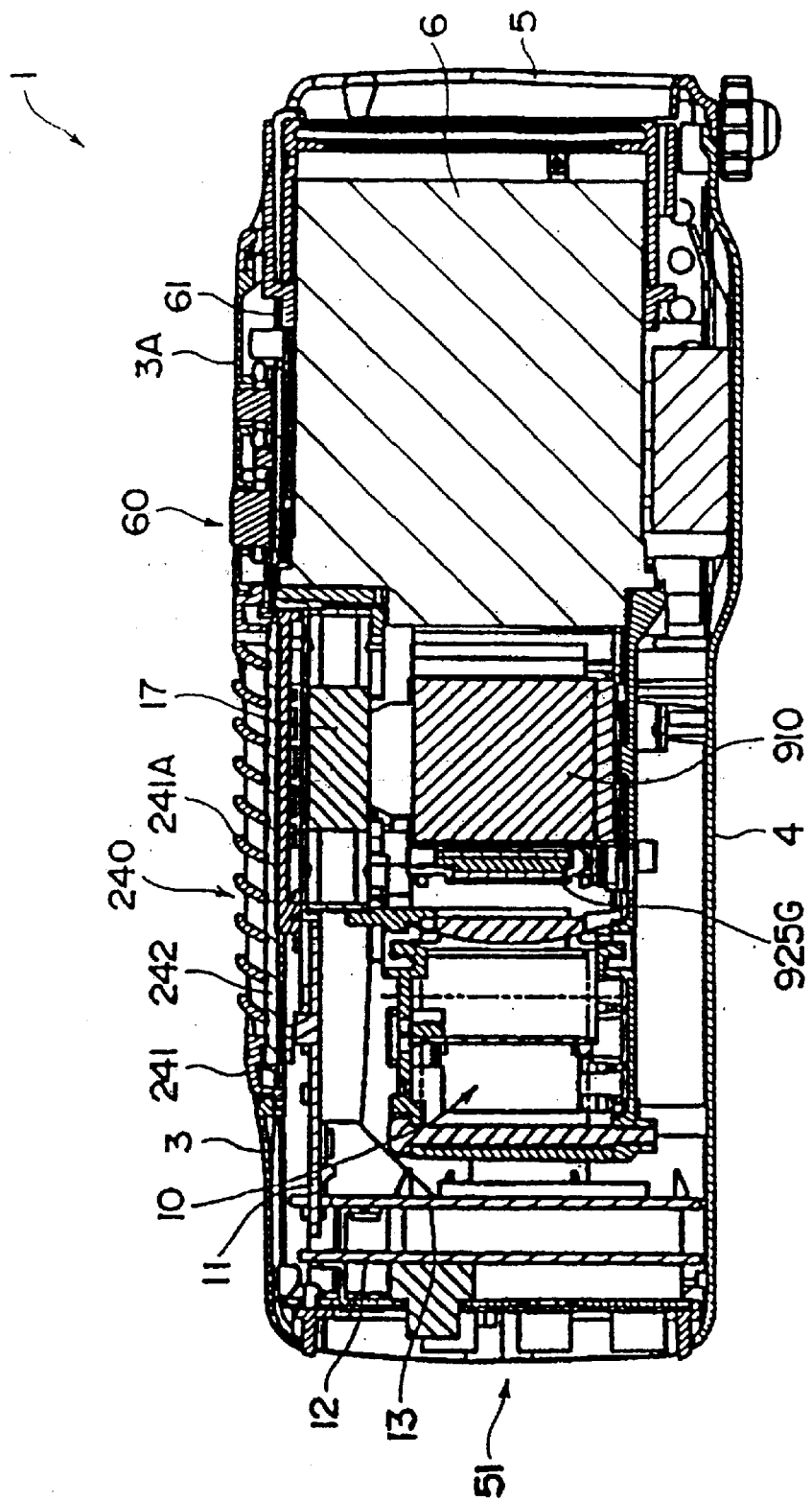

[FIG.9]
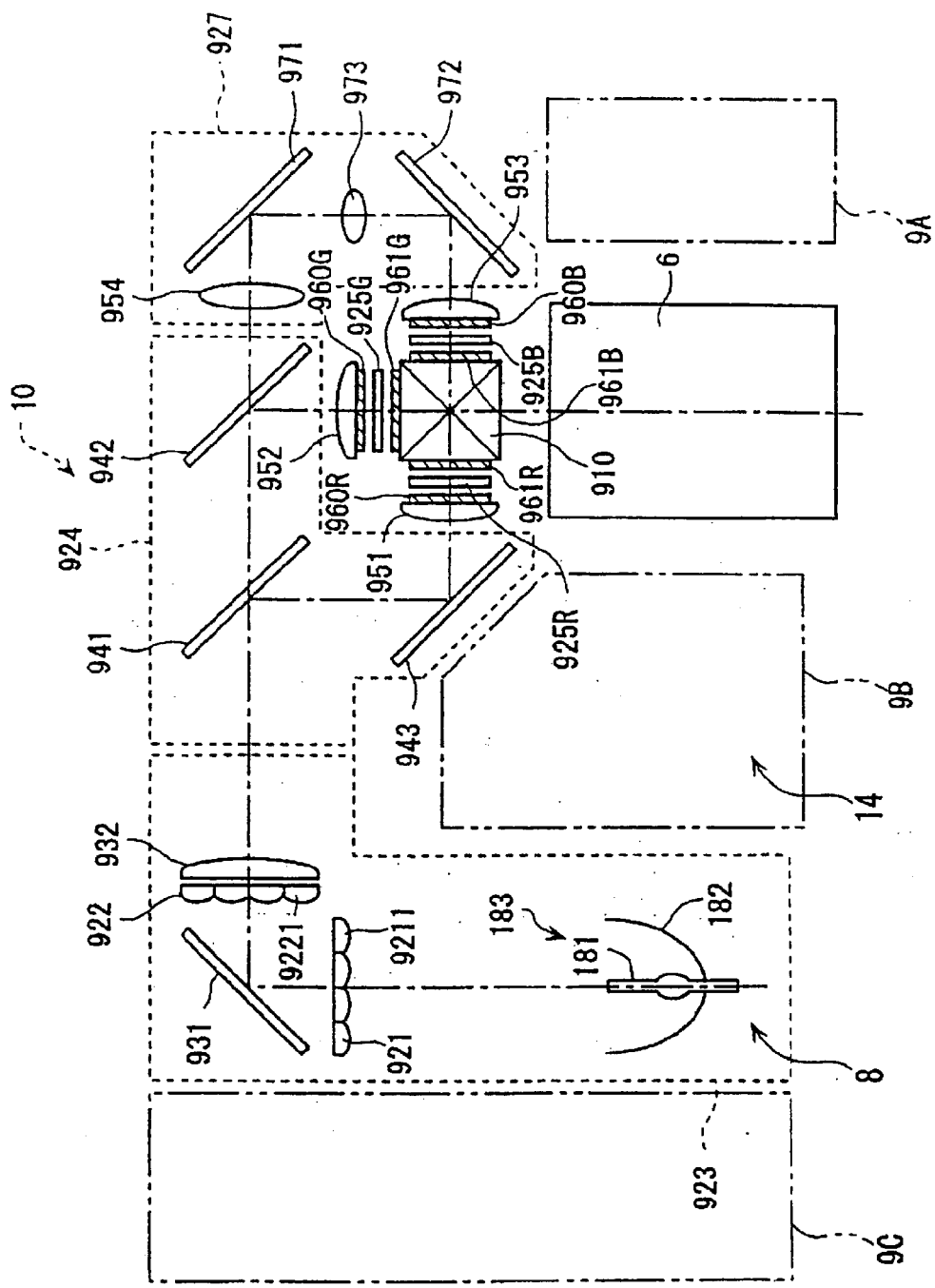

[FIG. 10]
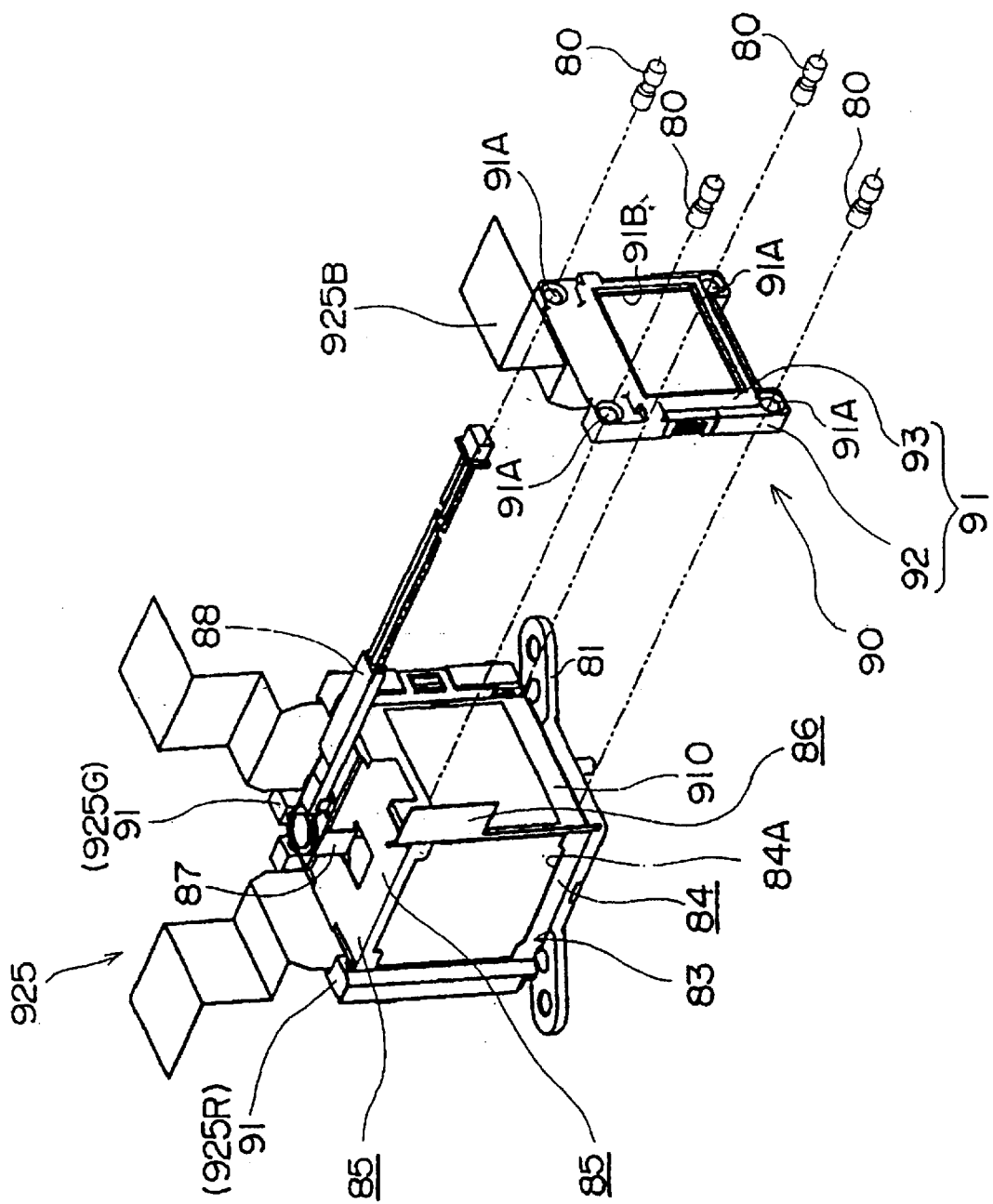

[FIG. 11]
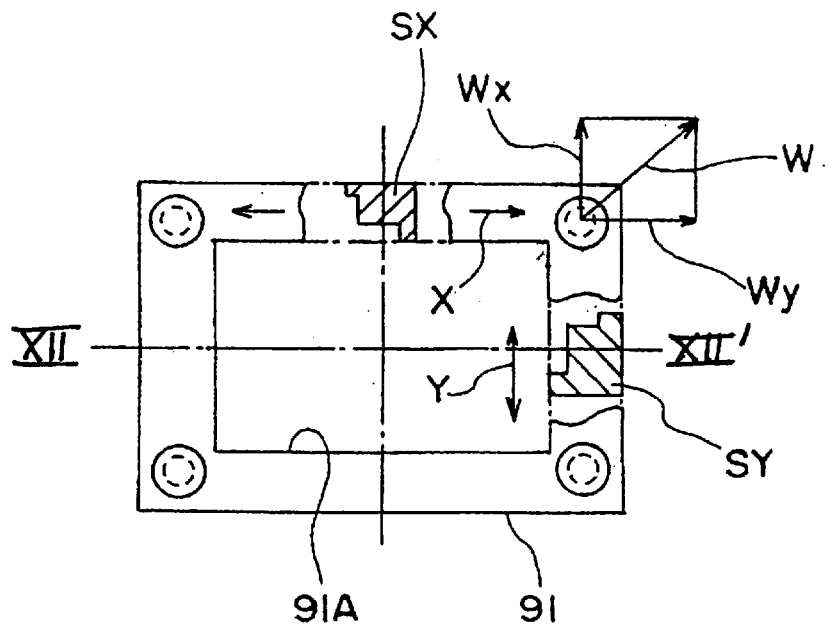
[FIG. 12]
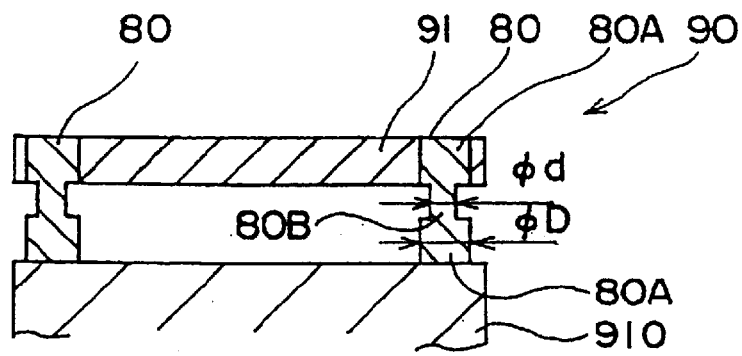

UNIT FOR MOUNTING ELECTRO-OPTICAL DEVICE AND PROJECTOR USING THE UNIT

This is a Continuation-in-Part of application No. Ser. 09/495,178 filed Feb. 1, 2000. The entire disclosure of the prior application(s) is hereby incorporated by reference herein in its entirety.

BACKGROUND OF THE INVENTION

1. Field of Invention

The present invention relates to a unit for mounting, on a prism, an electro-optical device for modulating a plurality of colored light beams in accordance with image data, and a projector using the unit for mounting an electro-optical device.

2. Description of Related Art

Hitherto, projectors have been used which include an electro-optical device for modulating a plurality of colored light beams in accordance with image data, a cross-dichroic prism for synthesizing the light beams modulated by the electro-optical device, and a projection lens for enlarging and projecting the light beams synthesized by the prism.

Projectors are widely used for multimedia presentations at public meetings, such as conferences, academic meetings, and exhibitions. The projector is brought to the conference room, and is occasionally moved to another place, as needed. Therefore, reduction in size of projectors has progressed.

Recently, the projectors have been reduced in size and have been provided with a structure in which three optical modulators are fixed to side surfaces of a cross-dichroic prism via a fixing material, so as to simplifying the structure. Hereinafter, the structure is called a "POP structure" (panel-on-prism structure).

In the POP structure, electro-optical devices supported by supporting frames are fixed by soldering or via an adhesive to the surfaces of a prism at a predetermined distance from the surfaces of the prism. The inventor of the present application proposed in an unpublished patent application a POP structure in which pins, to which an adhesive is applied, are inserted into holes formed in an electro-optical device at four corner thereof, each pin being fixed to a prism at an end of the pin and to a supporting frame of the electro-optical device at the periphery of the pin (Japanese Patent Application No. 11-25345).

A projector is provided with a light source, a power source, and the like. Certain parts of the projector heat up during use. Therefore, the projector is provided with a cooling fan, an exhaust fan, and the like so that the inside of the projector does not become excessively hot.

SUMMARY OF THE INVENTION

The supporting frame of an electro-optical device is generally made of a resin which has a coefficient of thermal expansion higher than that of a prism, which is made of glass. Therefore, when the projector is used, the supporting frame is expanded by the heat more than the prism. Since the supporting frame is mounted via the fixing pins as described above, the expansion of the supporting frame affects the fixing pins and pushes the fixing pins, thereby displacing the supporting frame from the predetermined mounted position. As a result, there is a risk of aberration in picture elements, which would deteriorate the image quality.

Accordingly, an object of the present invention is at least to provide a mounting unit and a projector using the mounting unit in which displacement of an electro-optical device, such as a liquid crystal panel, can be suppressed, the displacement being caused by heat generated when the projector is used.

According to one exemplary embodiment of the present invention, a unit for mounting an electro-optical device may consist of a supporting frame for supporting an electro-optical device, and a fixing pin for fixing the supporting frame for supporting an electro-optical device to a prism. The fixing pin is fixed to the prism at an end of the fixing pin and is fixed to the electro-optical device at an end or intermediate part of the fixing pin, particularly at a side surface thereof. The fixing pin is provided with an absorbing structure for absorbing deformation by heat of the supporting frame.

According to various embodiments of this invention, the absorbing structure can absorb deformation by heat of the supporting frame, whereby, when the supporting frame is expanded by heat, the fixing pin can absorb the effects of the expansion to some extent. Therefore, the electro-optical device, such as a liquid crystal panel, can be prevented from being displaced by heat generated when the projector is used.

The absorbing structure may have different cross-sectional areas depending on sections, thereby providing resiliency. Further, the absorbing structure may use a resilient material for a portion of the fixing pin so as to use deflection of the material, or may be any structure which can absorb the deformation by heat.

According to one exemplary embodiment of the present invention, the fixing pin may be made of one material and the cross-sectional area of the fixing pin may be smaller at least at the intermediate part than at the end thereof fixed to the prism. The absorbing structure is preferably thus formed.

With this arrangement, the structure is simple and can be manufactured easily.

The fixing pin may have greater cross-sectional areas at the ends and a smaller cross-sectional area at an intermediate part of the fixing pin. The cross-sectional areas at the ends of the fixing pin may be different from each other.

According to another exemplary embodiment of the present invention, the following expression is preferably satisfied $$(d/D)^4 \times (1/W) = C$$

in which D denotes the diameter of the section of the end of the fixing pin to be fixed to the prism, d denotes the diameter of the section of the intermediate part of the fixing pin, W denotes a stress generated by the deformation by heat of the supporting frame, and C denotes a constant.

By considering the above expression, it is possible to calculate the size of the fixing pin according to the material and the size of the supporting frame for supporting the electro-optical device.

According to another exemplary embodiment of the present invention, the supporting frame for supporting an electro-optical device is preferably made of a resin including a carbon fiber.

By using a resin including a carbon fiber, the supporting frame for supporting an electro-optical device can be relatively easily formed which has a coefficient of thermal expansion lower than that which uses a pure resin. Therefore, the stress applied to the fixing pin by thermal expansion of the supporting frame for supporting an electro-optical device can be reduced, whereby deformation by heat of the supporting frame of the electro-optical device can be surely avoided.

The cross-sectional area of the supporting frame for supporting an electro-optical device is preferably 40 mm$^2$ or less.

With this arrangement, the stress applied to the fixing pin by thermal expansion of the supporting frame for supporting an electro-optical device can be reduced, thereby suppressing deformation by heat of the supporting frame of the electro-optical device more reliably.

The above-described unit for mounting an electro-optical device can be used for a projector which may consist of a plurality of electro-optical devices for modulating a plurality of colored light beams in accordance with image data, a prism for synthesizing the light beams modulated by the electro-optical devices, and a projection lens for enlarging and projecting the light beams synthesized by the prism. When the projector is provided with the unit described above for mounting an electro-optical device, the displacement of the electro-optical devices caused by heat during the use of the projector can be avoided, whereby a projector which can maintain a high image quality for a long period is made possible.

BRIEF DESCRIPTION OF THE DRAWINGS

FIG. 1 is an external perspective view from the upper side of a projector according to an exemplary embodiment of the present invention.

FIG. 2 is an external perspective view from the bottom of the projector according to the exemplary embodiment.

FIG. 3 is a perspective view of an internal structure of the projector according to the exemplary embodiment.

FIG. 4 is a perspective view of an optical system of the projector according to the exemplary embodiment.

FIG. 5 is a perspective view of the optical system according to the exemplary embodiment.

FIG. 6 is a perspective view of the optical system according to the exemplary embodiment.

FIG. 7 is a vertical sectional view of the projector shown in FIG. 1 along lines VII–VII'.

FIG. 8 is a vertical sectional view of the projector shown in FIG. 7 along lines VII–VIII'.

FIG. 9 is a schematic diagram showing the function of the optical system according to the exemplary embodiment of the present invention.

FIG. 10 is an exploded perspective view of the mounting structure of a unit for mounting an electro-optical device on a crossed dichroic prism, according to the exemplary embodiment of the present invention.

FIG. 11 is a schematic view showing the direction of stresses applied by thermal expansion of a supporting frame for supporting an electro-optical device according to the exemplary embodiment of the present invention.

FIG. 12 is a sectional view of the supporting frame shown in FIG. 11 along line XII–XII'.

DETAILED DESCRIPTION OF PREFERRED EMBODIMENTS

Figure 13:
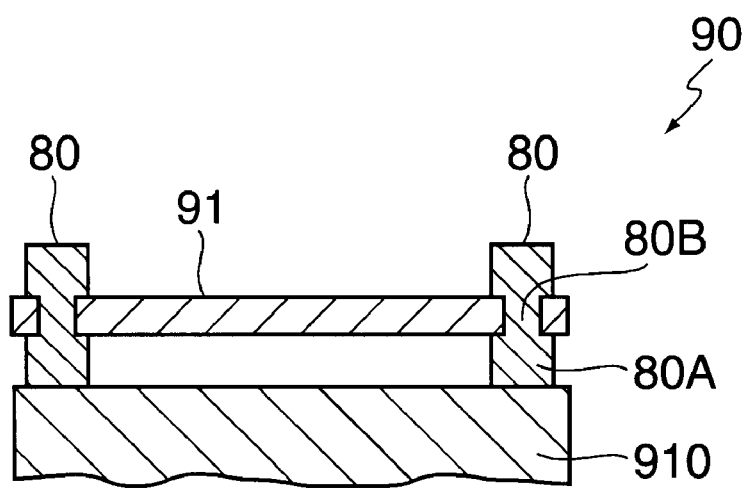
FIG. 13 is an alternative sectional view of the supporting frame shown in FIG. 11.

An exemplary embodiment according to the present invention is described below with reference to the drawings.

(1) General Configuration of the Device

FIGS. 1 and 2 are schematic perspective views of a projector 1 according to the present embodiment. FIG. 1 is a perspective view of the projector 1 from the upper side, and FIG. 2 is a perspective view thereof from the bottom.

The projector 1 is of a type in which a light beam emitted by a lamp as a light source is split into three light beams of the primary colors red (R), green (G), and blue (B). Each colored light beam is transmitted through and modulated in accordance with image data by a liquid crystal panel forming a modulation system. The modulated light beams of each color are resynthesized by a cross-dichroic prism, and the resynthesized beams are displayed enlarged on a projection area through a projection lens 6. Each component unit is received in an outer casing 2. The projection lens 6 is disposed so as to protrude from the outer casing 2, as needed, by a zoom mechanism.

(2) Structure of the Outer Casing

The outer casing 2 includes, as major components, an upper case 3 covering the upper portion of the device, a lower case 4 forming the bottom of the device, and a front case 5 covering the front. The upper case 3 and the lower case 4 are made by die-casting magnesium, and the front case 5 is made of resin.

The upper case 3 is provided with an air-inlet 240 in the upper face thereof toward the right from the center (in front view). The air-inlet 240 is covered by a filter-exchange cover 241 made of resin. The filter-exchange cover 241 is provided with slit-shaped holes 241A for introducing air from the outside into the device for cooling. An air filter 242 (see FIG. 8) is provided under the filter-exchange cover 241. By removing the filter-exchange cover 241 from the upper face of the upper case 3, the air filter 242 in the device can be exchanged.

A number of through-holes 251 for a speaker 250 (see FIG. 7) are formed on the upper face of the upper case 3 toward the front side from the filter-exchange cover 241. A control panel 60 for controlling the image quality and the like of the projector 1 is provided beside the through holes 251. A portion of the upper case 3 which is provided with the filter-exchange cover 241, the through-holes 251, and the control panel 60 is raised so as to form a raised part 3A, as shown in FIGS. 7 and 8. Components such as the air filter 242, the speaker 250, and a circuit board 61 are received in an inner space formed by the raised part 3A.

As shown in FIG. 2, a lamp-exchange cover 27 is provided on the bottom face of the lower case 4. A lamp unit 8 (see FIGS. 3 and 4) is received under the lamp-exchange cover 27, and by removing the lamp-exchange cover 27, the lamp unit 8 is exchanged. Feet 31R and 31L are provided on the bottom face of the lower case 4 at the corners of the front part, and a foot 31C is provided on the bottom face of the lower case 4 at an intermediate part of the rear side. The feet 31R and 31L protrude and withdraw in the protruding direction by rotating a dial or by moving levers 32R and 32L. The height and inclination of a displayed picture plane can be changed by controlling the amount of protrusion of each of the feet 31R and 31L.

As shown in FIG. 1, the front case 5 is provided with a light receiving part 70 at the right part of the face of the front case 5 for receiving optical signals from a remote controller which is not shown. The front case 5 is provided with an air outlet 160 substantially at the center of the front case 5 for discharging the air from the device.

As shown in FIG. 2, the outer casing 2 is provided with terminals, such as an AC inlet 50 for connection to an external power supply, and various input and output terminals 51.

(3) Internal Structure of the Device

The internal structure of the projector 1 is shown in FIGS. 3 to 8. FIG. 3 is a schematic perspective view of the inside of the projector 1. FIG. 4 is a perspective view of an optical system. FIGS. 5 and 6 are perspective views of the inside of the optical system. FIGS. 7 and 8 show vertical sections of the projector 1.

As shown in these drawings, the light source lamp unit 8, a power supply unit 9, an optical unit 10, a driver board 11 (see FIG. 8), a main board 12, an AV board 13, and the like are disposed in the outer casing 2.

According to the present embodiment, the light source lamp unit 8, the optical unit 10, and the above-described projection lens 6 form a U-shaped (in plan view) optical system according to the present invention, as shown in FIG. 9. The boards 11, 12, and 13 constitute a control system according to the present invention.

The power supply unit 9 is configured with a first power supply block 9A disposed at the side of the projection lens 6 of the optical system, a second power supply block 9B disposed in a recess 14 formed in the U-shaped (in plan view) optical system at an intermediate part thereof, that is, between the projection lens 6 and the light source lamp unit 8, and a third power supply block 9C disposed at the side of the light source lamp unit 8 of the optical system.

The first power supply block 9A is provided with the above-described AC inlet 50, and distributes the power supplied from an external power source through the AC inlet 50 to the second and third power supply blocks 9B and 9C.

The second power supply block 9B transforms the voltage of the power supplied by the first power supply block 9A, and supplies the transformed power to the main board 12 which is a major component of the control system. An auxiliary exhaust fan 15 driven by the power supplied by the second power supply block 9B is disposed at the air outlet 160 side of the second power supply block 9B.

The third power supply block 9C transforms the voltage of the power supplied by the first power supply block 9A, and supplies the transformed power to a light source device 183 (see FIG. 9) as a light source included in the light source lamp unit 8. Since the third power supply block 9C must supply power to the light source device 183 which consumes the greatest amount of electricity, the third power supply block 9C is larger than the first and second power supply blocks 9A and 9B, and is disposed along the entire projector 1.

The first, second, and third power supply blocks 9A, 9B, and 9C are fixed to the lower case 4 by screws or the like before affixing the projector lens 6 and the optical unit 10. The first power supply block 9A may supply power only to the second power supply block 9B, and the second power supply block 9B may distribute the power to the third power supply block 9C.

The light source lamp unit 8 functions as a light source for the projector 1. As shown in FIG. 9, the light source lamp unit 8 includes the light source device 183 including a light source lamp 181 and a concave mirror 182, and a lamp housing 184 containing the light source device 183.

As shown in FIG. 7, the lamp housing 184 is provided with an on-off detector 260 for determining whether or not the light source lamp 181 is in use.

The light source lamp unit 8 including the lamp housing 184 is covered by a receiving part 9021 which is formed integrally with an upper light guide 901 forming a light guide 900 which is described below. The light source lamp unit 8 can be removed by removing the above-described lamp-replacement cover 27. A main exhaust fan 16 which is larger than the auxiliary exhaust fan 15 is disposed at the front of the receiving part 9021 at a position associated with the air outlet 160. The main exhaust fan 16 is driven by the power supplied from the second power supply block 9B.

The optical unit 10 forms an optical image by optically processing the light beams from the light source lamp unit 8 in accordance with image data. The optical unit 10 is provided with the light guide 900. The light guide 900 is configured with the upper light guide 901 which is made of resin and is box-shaped, and a lower light guide 902 which is made of magnesium and is lid-shaped. The optical unit 10 includes an illumination optical system 923, a colored-light-beam separating optical system 924, a modulation system 925, and a cross-dichroic prism 910. The lower light guide 902 is provided with a vertical head plate 903 to which the projection lens 6 is fixed. The optical elements of the optical unit 10, other than the modulation system 925 and the cross-dichroic prism 910, are held between the upper and lower light guides 901 and 902 to be sandwiched thereby. The upper light guide 901 and the lower light guide 902 are assembled as a unit and are fixed to the lower case 4 side.

The cross-dichroic prism 910 is disposed at the opposite side to the projection lens 6 with the head plate 903 therebetween, and is fixed to the lower light guide 902 by a fixing material. Liquid crystal panels 925R, 925G, and 925B, which form the modulation system 925, are disposed opposing three faces of the cross-dichroic prism 910, and are fixed to the opposing faces thereof by a fixing material. The liquid crystal panels 925R, 925G, and 925B are positioned so that the liquid crystal panel 925B and the liquid crystal panel 925R oppose each other with the cross-dichroic prism 910 therebetween, and the liquid crystal panel 925G opposes the projection lens 6 with the cross-dichroic prism 910 therebetween. The liquid crystal panels 925R, 925G, and 925B are cooled by cooling air applied by an air intake fan 17 disposed above the cross-dichroic prism 910, and associated with the air-inlet 240. The power for driving the air intake fan 17 is supplied by the main board 12 through the driver board 1.

The driver board 11 for controlling the liquid crystal panels 925R, 925G, and 925B is disposed above the optical unit 10.

The main board 12 which is provided with a control circuit for controlling the entire projector 1 is disposed in a vertical manner at the rear side of the optical unit 10. The main board 12 and the driver board 11 disposed perpendicular to each other are electrically connected to each other via a connector. The main board 12 is connected through a cable to a lamp-signal-detecting circuit board 230 for detecting signals from the on-off detector 260.

The AV board 13 is a circuit board provided with the input and output terminals 51, is disposed in a vertical manner between the optical unit 10 and the main board 12, and is electrically connected to the main board 12.

In the above-described internal structure, cooling air introduced by the air-intake fan 17 cools the modulation system 925, and is led to the side of the light source lamp unit 8, while cooling the boards 11, 12, and 13, by the rotation of the air exhaust fans 15 and 16. The cooling air led into the light source lamp unit 8 cools the light source device 183 included therein, together with fresh cooling air introduced through an inlet 4A (see FIG. 2) disposed at the bottom of the lower case 4. A part of the cooling air flows to the side of the second power supply block 9B, and the other part of the cooling air flows to the side of the third power supply block 9C, thereby cooling the second and third power supply blocks 9B and 9C. Thereafter, the cooling air is discharged to the front side of the projector 1 by the air-exhaust fans 15 and 16 through the air-outlet 160.

(4) Configuration of the Optical System

The optical unit 10 of the optical system is described in detail as follows with reference to FIGS. 5 and 9.

The optical unit 10 includes the illumination optical system 923, the colored-light-beam separating optical system 924, and a relay optical system 927 received in the upper light guide 901. The optical unit 10 also includes the cross-dichroic prism 910 fixed to the lower light guide 902, and the projection lens 6 fixed to the head plate 903 of the lower light guide 902.

The illumination optical system 923 is an integrator illumination optical system for evenly illuminating image forming regions of the three liquid crystal panels 925R, 925G, and 925B which form the modulation system 925. The illumination optical system 923 includes the light source device 183, a first lens array 921, a second lens array 922, a reflecting mirror 931, and an superimposing lens 932. The lens arrays 921 and 922, the superimposing lens 932, and the reflecting mirror 931 are disposed to be supported by vertical potions of the upper light guide 901, and are affixed by clips 7 which are members for preventing falling out, whereby these components do not fall out when the upper guide 901 is turned over in the state shown in FIG. 3.

The light source device 183 forming the illumination optical system 923 includes the light source lamp 181 which emits, as a radial beam emitter, radial light beams, and the concave mirror 182 which converts the radial light beams from the light source lamp 181 into substantially parallel light beams and emits the same. Generally, a halogen lamp, a metal halide lamp, or a high pressure mercury-vapor lamp is used as the light source lamp 181. A parabolic mirror or an ellipsoidal mirror is preferably used as the concave mirror 182.

The first lens array 921 includes small lenses 9211, having a substantially rectangular outline, aligned in a matrix having M rows and N columns. The small lenses 9211 split the parallel light beam incident from the light source into a plurality (M×N) of split light beams, and applies the split light beams in the vicinity of the second lens array 922 to form an image. Each small lens 9211 has an outline of a shape substantially the same as the shape of the image-forming region of each of the liquid crystal panels 925R, 925G, and 925B. For example, when the image-forming region of the liquid crystal panel has an aspect ratio (the ratio of the width to the height) of 4:3, the aspect ratio of each small lens is set to 4:3.

The second lens array 922 includes small lenses 9221 aligned in a matrix having M rows and N columns so as to be associated with the small lenses 9211 of the first lens array 921. The second lens array 922 arranges the center axes of the split light beams (principal rays) emitted by the first lens array 921 so that the principal rays are applied perpendicularly to the incidence plane of the superimposing lens 932. The superimposing lens 932 superimposes the plurality of split light beams on the three liquid crystal panels 925R, 925G, and 925B. The second lens array 922 is disposed to be inclined by 90 degrees with respect to the first lens array 921 with the reflecting mirror 931 therebetween.

The reflecting mirror 931 guides the light beams emitted by the first lens array 921 to the second lens array 922. The reflecting mirror 931 is not always required depending on the configuration of an illumination optical system. For example, it is not necessary when the first lens array 921 and the light source are disposed parallel to the second lens array 922.

The colored-light-beam separating system 924 according to the present invention includes two dichroic mirrors 941 and 942 and a reflecting mirror 943, and splits the light beams from the superimposing lens 932 into three colored light beams of red, green, and blue. Each of the mirrors 941, 942, and 943 is supported by vertical portions of the upper light guide 901 and are fixed to the upper light guide 901 by the clips 7 in the same manner described above.

The relay optical system 927 includes an incident-side lens 954, a relay lens 973, and reflecting mirrors 971 and 972. The reflecting mirrors 971 and 972 are also fixed to the upper light guide 901 by the clips 7.

In the liquid crystal panels 925R, 925G, and 925B included in the modulation system 925, for example, poly-silicon TFTs are used as switching elements. The liquid crystal panels 925R, 925G, and 925B are disposed in a concave part 904 (see FIG. 5) outside the upper light guide 901 and at the periphery thereof, and are fixed to the corresponding three faces of the cross-dichroic prism 910 by a fixing material in an opposed state. At the incident and emission sides of the liquid crystal panels 925R, 925G, and 925B, incident-side polarizing plates 960R, 960G, and 960B are disposed at the incident side, respectively, and emission-side polarizing plates 961R, 961G, and 961B are disposed at the emission side, respectively.

The cross-dichroic prism 910 forms a colored image by synthesizing three colored light beams. The cross-dichroic prism 910 is fixed to the upper face of the lower light guide 902 by fixing screws. The cross-dichroic prism 910 includes a multilayer dielectric film which reflects red light beams and a multilayer dielectric film which reflects blue light beams disposed substantially in an X-shape along the interfaces between four right-angle prisms. The three colored light beams are synthesized by these multilayer dielectric films.

In FIG. 10, the cross-dichroic prism 910 is provided with light-shielding members 83 for shielding light which leaks toward the projection lens 6 side from a gap between each of the liquid crystal panels 925R, 925G, and 925B and the sides of the cross-dichroic prism 910. The light-shielding members 83 are formed by bending a thin metallic plate, and are coated with an antireflection film on the entire surfaces thereof. Each light-shielding member 83 includes a shielding part 84, a positioning part 85, and a rectifying part 86.

The projection lens 6 is the heaviest component among the optical components in the projector 1. As shown in FIG. 8, the projection lens 6 is fixed to the head plate 903 of the lower light guide 902 by screws or the like through a flange 62 disposed at a base end of the projection lens 6.

The optical unit 10 configured as described above is assembled as described below.

The box-shaped upper light guide 901 is placed so that the open side thereof is disposed upward. Optical components (reflecting mirrors, lenses, and the like) such as the illumination optical system 923, the colored-light-beam separating optical system 924, and the relay optical system 927 are placed in the upper light guide 901 and are fixed thereto by the clips 7.

The lid-shaped lower light guide 902 is provided thereon with the crossed dichroic prism 910 having the liquid crystal panels 925R, 925G, and 925B fixed thereto, the cross-dichroic prism 910 being fixed to the lid-shaped lower light guide 902. The projection lens 6 is fixed to the head plate 903. Then, the upper light guide 901 with the optical components fixed thereto is turned over, mounted so as to cover the lower light guide 902, and fixed thereto.

The light guide 900 thus configured is fixed to the lower case 4 by a fixing material such as screws.

The lower light guide 902 provided with the liquid crystal panels 925R, 925G, and 925B, the cross-dichroic prism 910, and the projection lens 6 mounted thereon may be fixed to the lower case 4 in advance, then, the upper light guide 901 provided with the optical components may be turned over, mounted so as to cover the lower light guide 902, and fixed to the lower case 4 by fixing members such as screws.

Only the lower light guide 902 may be fixed to the lower case 4 in advance by screws, then, the liquid crystal panels 925R, 925G, and 925B and the cross-dichroic prism 910 are mounted on and the projection lens 6 is fixed to the lower light guide 902, and the upper light guide 901 provided with the optical components may be turned over, mounted so as to cover the lower light guide 902, and fixed to the lower case 4 by fixing members such as screws.

Although the cross-dichroic prism 910 and the projection lens 6 are fixed to the lower light guide 902 by screws, and the upper and lower light guides 901 and 902 are fixed to the lower case 4 by screws, other appropriate fixing methods such as bonding and mating may be used.

(5) Functions of the Optical System

In the optical unit 10 shown in FIG. 9, substantially parallel light beams emitted by the light source device 183 are split into a plurality of split light beams by the first and second lens arrays 921 and 922 which form an integrator optical system (the illumination optical system 923). The split light beams from the small lenses 9211 of the first lens array 921 are applied, by the superimposing lens 932 substantially in an integrated fashion, to the image-forming regions of the liquid crystal panels 925R, 925G, and 925B. The liquid crystal panels 925R, 925G, and 925B are illuminated by luminous light substantially evenly distributed in a plane.

In this case, the first dichroic mirror 941 reflects a red beam component and transmits green and blue beam components of the light beam from the illumination optical system 923. The red light beam reflected by the first dichroic mirror 941 is reflected by the reflecting mirror 943, is transmitted through a field lens 951, and is applied to the red liquid crystal panel 925R. The field lens 951 converts each split light beam from the second lens array 922 into a light beam parallel to the central axis (principal ray) of the split light beam. The field lenses 952 and 953 provided in front of the liquid crystal panels 925G and 925B have the same function.

The green light beam separated from the green and blue light beams transmitted through the first dichroic mirror 941 is reflected by the second dichroic mirror 942, is transmitted through a field lens 952, and is applied to the green liquid crystal panel 925G. The blue light beam is transmitted through the second dichroic mirror 942, through the relay optical system 927 and a field lens 953, and is applied to the blue crystal panel 925B. The relay optical system 927 for the blue light beam is provided for preventing the efficiency in usage of the light from being reduced due to light spreading, which is likely to occur because the optical path of the blue light beam is longer than that of the other color light beams. That is, the relay optical system 927 is provided in order to transmit, as it is, the split light beam incident on the incident-side lens 954 to the field lens 953.

When the red, green, and blue light beams are applied to the liquid crystal panels 925R, 925G, and 925B, respectively, the incident-side polarizing plates 960R, 960G, and 960B transmit particular polarized-beams of the incident light beams. The polarized beams are modulated by the liquid crystal panels 925R, 925G, and 925B in accordance with given image data, and are applied to the emission-side polarizing plates 961R, 961G, and 961B, respectively, as modulated beams. The emission-side polarizing plates 961R, 961G, and 961B transmit particular polarized-beams of the modulated beams, and the polarized beams are applied to the cross-dichroic prism 910. The polarized light beams of the colored light beams are converted to synthesized light beams by being synthesized by the cross-dichroic prism 910, and are emitted toward the projection lens 6. The synthesized light beams are projected by the projection lens 6 as colored images on a projection area such as a projection screen.

(6) The Structure of a Unit for Mounting an Electro-optical Device and Fixing Pins FIG. 10 shows the structure for mounting the liquid crystal panels 925R, 925G, and 925B on the cross-dichroic prism 910.

The liquid crystal panels 925R, 925G, and 925B are disposed opposing three side faces, respectively, of the cross-dichroic prism 910 which are light incidence surfaces, and are fixed to the opposing surfaces (light incidence surfaces) via fixing pins 80 and electro-optical-device supporting frames 91.

The cross-dichroic prism 910 is disposed to be fixed on a cross-dichroic-prism supporting member 81 which is fixed to the lower light guide 902.

Each liquid crystal panel 925R, 925G, or 925B is supported by the electro-optical-device supporting frame 91. Each electro-optical-device supporting frame 91 includes a first frame 92 and a second frame 93 which sandwich the liquid crystal panel 925R, 925G, or 925B and a light transmitting plate for protecting the device from dust.

Holes 91A are formed in each electro-optical-device supporting frame 91 at the four corners thereof. The fixing pins 80 are inserted into the holes 91A. As shown in FIG. 12, each fixing pin 80 has a cross-sectional area larger at the ends than at an intermediate part 80A thereof. The fixing pin 80 is fixed to the prism 910 at an end of the fixing pin 80 by an adhesive which is cured by ultraviolet light, and is fixed to the electro-optical-device supporting frame 91 at an end part of the fixing pin 80 (FIG. 12), particularly at any side surface of the end part of the fixing pin 80 (FIG. 12) or intermediate part of the fixing pin 80 (FIG. 13) by the adhesive which is cured by ultraviolet light. Each fixing pin 80 is made of a single molded-resin such as an acrylic resin.

The liquid crystal panels 925R, 925G, and 925B are fixed to the prism 910 in processes, for example, as described below. Each of the liquid crystal panels 925R, 925G, and 925B is supported between the first frame 92 and the second frame 93. Each fixing pin 80 is coated with an adhesive at the end, which is fixed to the prism 910, and the periphery of the fixing pin 80. The fixing pin 80 coated with the adhesive is inserted into the hole 91A of the electro-optical-device supporting frame 91, and is brought into contact, at the end of the fixing pin 80, with the light incidence surface of the cross-dichroic prism 910. Then, the position of each liquid crystal panel 925R, 925G, or 925B is adjusted while verifying a projected image enlarged and projected by the projection lens 6, and the adhesive is cured by applying ultraviolet light.

The electro-optical-device supporting frames 91 are made of a polyphenylene sulfide (PPS) including 30% of carbon fiber. When the supporting frame 91 is shown by the x-axis in the vertical direction and by the y-axis in the horizontal direction, the supporting flame 91 is expanded and contracted by heat in the x and y directions. In this case, a resultant force W of a vertical force Wx and a horizontal force Wy is applied to the fixing pin 80. The forces Wx and Wy are different according to the material and the cross-sectional area of the supporting fame 91. For example, when the material of the supporting frame is a PPS including 30% of carbon fiber, such as in the present embodiment, it is known that a linear expansion coefficient $\lambda$ is $2.0 \times 10^{-5}$ (in the direction perpendicular to the flow). When the material of the supporting frame is a PPS including 30% of glass fiber, it is known that the linear expansion coefficient $\lambda$ is $4.3 \times 10^{-5}$ (in the direction perpendicular to the flow). The expanding force of a PPS including 30% of carbon fiber is smaller than that of a PPS including 30% of glass fiber. The resultant force W is preferably as small as possible so as not to apply a serious load to the fixing pin 80.

Two types A and B of the supporting frames were prepared. The result of measuring a cross-sectional area S and an expanding force W shown in FIG. 11 is shown in Table 1. Sx denotes a cross-sectional area of a longer member of the supporting frame; and Sy denotes a cross-sectional area of a shorter member of the same. In the present embodiment, the B-type supporting frame is used which has smaller cross-sectional areas.

TABLE 1

Cross-Sectional Area (S) and Expanding Force (W)

| Type | Sx | Sy | Expanding Force (Resultant Force) W |
|---|---|---|---|
| A | 23.03 mm² | 33.0 mm² | 28.2 Kg |
| B | 13.1 mm² | 19.0 mm² | 10.9 Kg |

In order that the fixing pin 80 absorb the expanding force of the supporting frame 91, the shear strength of the fixing pin 80 must be equal to or less than the expanding force of the supporting frame 91. According to the present embodiment, a resilient part, that is, an absorbing structure, for absorbing expanding force of the supporting frame generated by heat, is provided by making the cross-sectional area of the fixing pin 80 smaller at an intermediate part than at the end thereof fixed to the prism.

A process of determining the size of the fixing pin 80 according to the present embodiment is described below.

Three types of fixing pins 80a to 80c having diameters $\phi D$ of ends 80A thereof which were different from each other and diameters $\phi d$ of intermediate parts 80B thereof which were different from each other were prepared as samples. Since the resilient force of the fixing pin 80 is known to be proportional to the ratio to the fourth power between the diameter D of the end 80A and the diameter d of the intermediate part 80B, values $(d/D)^4$ were obtained from each sample. Then, a test was performed in which the A-type supporting frames shown in Table 1 fixed to the prisms 910 via the fixing pins 80a, 80b, and 80c, respectively, were left for a predetermined time in an environment in which the temperature could be changed periodically between high and low ranges, and the amount of aberration in the picture elements from each of the liquid crystals 925R, 925G, and 925B was measured. The result of the test is shown in Table 2. In the table, the symbol ○ indicates that the amount of aberration was in a permissible range, and the symbol @ indicates that the amount of aberration was very small.

TABLE 2

| Sample | 80a | 80b | 80c |
|---|---|---|---|
| $\phi d$ at an intermediate part | 3.27 | 2.5 | 2.0 |
| $\phi D$ at the ends | 3.27 | 3.27 | 3.27 |
| $(d/D)^4$ | 1/1 | 1/2.93 | 1/7.1 |
| Aberration in picture elements | ○ | ⊚ | ○ |

As a result of the test, it was verified that the amount of aberration in picture elements was minimal when the sample 80b was used, that is, when the value $(d/D)^4$ was 1/2.93.

By considering that the expanding force W of the supporting frame and the resilient force of the fixing pin 80 are proportional to each other, the resilient force of the fixing pin 80 to be used for the B-type supporting frame was estimated. That is, the resilient force of the fixing pin was determined so as to satisfy $(d/D)^4 \times (1/W) = C$(constant). The value C of approximately 9.62 kg$^{-1}$ is obtained from the test result shown in table 2. In table 1, the expanding force W of the B-type supporting frame is 10.9 kg; therefore, the value $(d/D)^4$ most suitable for the B-type supporting frame is substantially 1/1.13. That is, the diameter D of the ends 80A is preferably substantially 1.13 times the diameter d of the intermediate part 80B.

The above-described estimation was verified by the test described below. Four types of fixing pins 80d to 80g having diameters $\phi D$ of ends 80A thereof which were different from each other and diameters $\phi d$ of intermediate parts 80B thereof which were different from each other were prepared as samples. The value $(d/D)^4$ of each sample was obtained. Because it was difficult to form a sample having the value $(d/D)^4$ of 1/1.13 which was the estimated value, the fixing pin 80f which had a nearest value thereto was prepared as a sample, the fixing pin 80f having the value $(d/D)^4$ of 1/1.26. Then, the test was performed in which the B-type supporting frames shown in Table 1 fixed to the prisms 910 via the fixing pins 80d to 80g, respectively, were left for a predetermined time in an environment in which the temperature changed periodically between high and low ranges, which is an H/S (heat shock) test, and were left for a predetermined time in a high-temperature environment, which is a high-temperature test. Then, the amount of aberration in the picture elements from each of the liquid crystals 925R, 925G, and 925B was measured. The result of the test is shown in Table 3. In the table, the symbol ○ indicates that the amount of aberration was in a permissible range, the symbol ⊚ indicates that the amount of aberration was very small, the symbol Δ indicates that the amount of aberration was slightly out of the permissible range, and the symbol x indicates that the amount of aberration was far outside the permissible range.

TABLE 3

| Sample | 80d | 80e | 80f | 80g |
|---|---|---|---|---|
| $\phi d$ at an intermediate part | 1.7 | 2.1 | 2.5 | 2.6 |
| $\phi D$ at the ends | 2.65 | 2.65 | 2.65 | 3.0 |

TABLE 3-continued

| Sample | 80d | 80e | 80f | 80g |
|---|---|---|---|---|
| $(d/D)^4$ | 1/5.9 | 1/2.53 | 1/1.26 | 1/1.78 |
| Aberration in picture elements | | | | |
| H/S | ◯ | Δ | ◯ | ◯ |
| High-temperature | Δ | ◯ | ◯ | x |

As shown in the table, the amount of aberration is minimal when the fixing pin 80f which has the value $(d/D)^4$ of 1/1.26 is used, and it was verified that the estimated value is substantially the same as the tested value.

The results of the test support the conclusion that fixing pins suitable for supporting frames made of the same material and having sizes different from each other can be made by satisfying $(d/D)^4 \times (1/W) = C$(constant), when the value C of a given supporting frame and fixing pin, which provide a smallest aberration in picture elements, is obtained in advance from the expression.

(7) Advantages of the Embodiments

The present embodiment offers the following advantages.

(i) The cross-sectional area of the fixing pin 80 is larger at the ends 80A than at the intermediate part 80B of the fixing pin 80, thereby providing the fixing pin 80 with resiliency. That is, the fixing pin 80 is provided with an absorbing structure for absorbing deformation by heat of the electro-optical-device supporting frame 91. Therefore, when the electro-optical-device supporting frame 91 is expanded by heat from the light source lamp unit 8 and the like, the deformation thereby can be absorbed, whereby the aberration in picture elements can be reduced, and a projector in which image quality is not deteriorated over a long period of use may be made possible.

(ii) The fixing pin 80 is made of a single material of an acrylic resin or the like being molded, whereby a simple structure may be provided, thereby facilitating manufacture.

(iii) Fixing pins suitable for supporting frames made of the same material and having sizes different from each other can be made by satisfying $(d/D)^4 \times (1/W) = C$(constant), when the value C of a given supporting frame and fixing pin, which may provide the smallest aberration in picture elements, is obtained in advance from the expression.

(iv) The electro-optical-device supporting frame 91 made of a PPS including 30% of carbon fiber has an expansion coefficient lower than that which is made of pure resin, thereby reducing stress applied to the fixing pins, whereby deformation by heat of the electro-optical-device supporting frame 91 can be more positively prevented.

(v) The shorter side of the electro-optical-device supporting frame 91 has a cross-sectional area Sx of 13.1 mm$^2$, and the longer side of the same has a cross-sectional area Sy of 19 mm$^2$. Since the cross-sectional areas are small, the amount of expansion is relatively small, whereby the stress applied to the fixing pins can be suppressed at a low level, thereby positively preventing deformation by heat of the electro-optical-device supporting frame 91. The cross-sectional area Sx or Sy is preferably not greater than 40 mm$^2$ so that the thermal expansion may be suppressed while maintaining the mechanical strength of the supporting frame.

(8) Modification of the Embodiments According to the Present Invention

The present invention is not limited to the embodiments described above, and it includes other arrangements which can achieve the objects of the present invention. The following modification and the like are included in the present invention.

For example, although the fixing pin 80 has a cross-sectional area larger at the ends 80A than at the intermediate part 80B in the above-described embodiment, the shape of the fixing pin 80 is not limited to this arrangement. The cross-sectional area may be larger at one end to be fixed to the prism and smaller at the other part. When the cross-sectional area of the two ends 80A is made larger than that of the intermediate part 80B, the cross-sectional area of one of the two ends may be different from that of the other end.

In the above-described embodiment, although the fixing pin 80 is made by molding an acrylic resin or the like, and is provided with resiliency by changing the cross-sectional areas along the pin, thereby providing an absorbing structure, the embodiment is not limited to this arrangement. For example, a resilient material may be used as a part of the fixing pin so as to use the resiliency thereof, and any other structure which can absorb deformation by heat of the supporting frame 91 may be used.

Although the modulation system 925 according to the embodiment described above is configured with three liquid crystal panels 925R, 925G, and 925B, the modulation system is not limited to this arrangement, and it may include one liquid crystal panel, or may be configured with two liquid crystal panels.

Although liquid crystal panels are used as an electro-optical device according to the embodiment described above, the present invention may be applied to a projector in which a device using plasma elements or micro-mirrors is used as an electro-optical device.

Although the liquid crystal panels 925R, 925G, and 925B according to the above-described embodiments modulate while transmitting light beams R, G, and B, the present invention is applicable to a projector in which a reflective electro-optical device modulates, reflects, and emits light incident thereon.

The prism to be used is not limited to the cross-dichroic prism, as described in the above embodiment, which is configured with four triangular prisms and provided with two color-selective planes formed along the bonded faces of the triangular prisms. It may be a dichroic prism having one color-selective plane or a polarized beam splitter. The prism may be a dichroic prism configured with three prisms having shapes different from each other, the dichroic prism being provided with two color-selective planes formed along the interfaces between the three prisms. The prism may be formed with a substantially hexahedral light transmitting box provided therein with light-selective planes and filled with a liquid.

In the unit for mounting an electro-optical device and the projector using the unit for mounting an electro-optical device according to the present invention, an absorbing structure can absorb deformation by heat of a supporting frame for supporting an electro-optical device. When the supporting frame for supporting the electro-optical device is expanded by heat generated during the use of the projector, fixing pins can absorb the effects of the expansion to some extent, whereby the displacement of an electro-optical device such as a liquid crystal panel caused by the heat generated during the use of the projector is suppressed.

What is claimed is:

1. A unit for mounting an electro-optical device, comprising:

a supporting frame that supports an electro-optical device; and a fixing pin that fixes the supporting frame to a prism, the fixing pin being fixed to the prism at an end of the fixing pin and being fixed to the electro-optical device at a side surface the fixing pin, and the fixing pin comprising an absorbing structure that absorbs deformation by heat of the supporting frame.

2. The unit for mounting an electro-optical device according to claim 1, the fixing pin being made of single material and a cross;sectional area of the fixing pin being smaller at least at an intermediate part than at the end fixed to the prism, forming the absorbing structure.

3. The unit for mounting an electro-optical device according to claim 1, an expression $$(d/D)^4 \times (1/W) = C$$

being satisfied, in which D denotes a diameter of a section of the end of the fixing pin, d denotes a diameter of a section of an intermediate part of the fixing pin, W denotes a stress generated by the deformation by heat of the supporting frame, and C denotes a constant.

4. The unit for mounting an electro-optical device according to claim 1, the supporting frame being made of a resin including a carbon fiber.

5. The unit for mounting an electro-optical device according to claim 1, a cross-sectional area of the supporting frame being 40 mm$^2$ or less.

6. The projector according to claim 1, wherein the fixing pin is fixed to the electro-optical device at a side surface of an end part the fixing pin.

7. The projector according to claim 1, wherein the fixing pin is fixed to the electro-optical device at a side surface of an intermediate part the fixing pin.

8. A projector, comprising:

a plurality of electro-optical devices that modulates a plurality of colored light beams in accordance with image data;

a prism that synthesizes the light beams modulated by the electro-optical devices;

a projection lens that enlarges and projects the light beams synthesized by the prism; and the unit for mounting an electro-optical device according to claim 1, the electro-optical devices being mounted at side surfaces of the prism by the unit for mounting an electro-optical device.

9. The projector according to claim 8, the fixing pin being made of single material and a cross-sectional area of the fixing pin being smaller at least at an intermediate part than at the end fixed to the prism, forming the absorbing structure.

10. The projector according to claim 8, an expression $$(d/D)^4 \times (1/W) = C$$

being satisfied, in which D denotes a diameter of a section of the end of the fixing pin, d denotes a diameter of a section of an intermediate part of the fixing pin, W denotes a stress generated by the deformation by heat of the supporting frame, and C denotes a constant.

11. The projector according to claim 8, the supporting frame being made of a resin including a carbon fiber.

12. The projector according to claim 8, a cross-sectional area of the supporting frame being 40 mm$^2$ or less.

\* \* \* \* \*